F. W. SPRINGER.
SHOCK ABSORBER FOR VEHICLES.
APPLICATION FILED AUG. 31, 1917.
1,387,081. Patented Aug. 9, 1921.
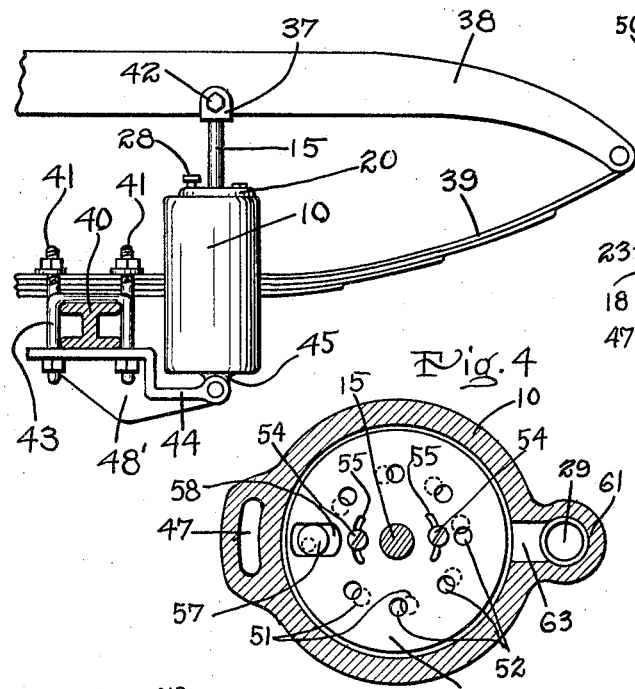
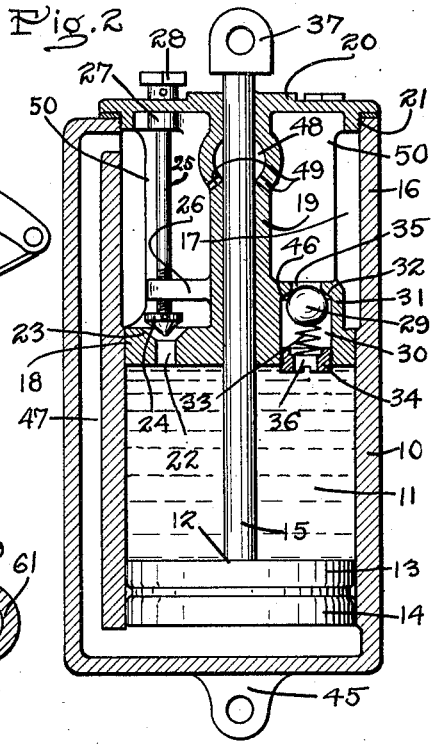
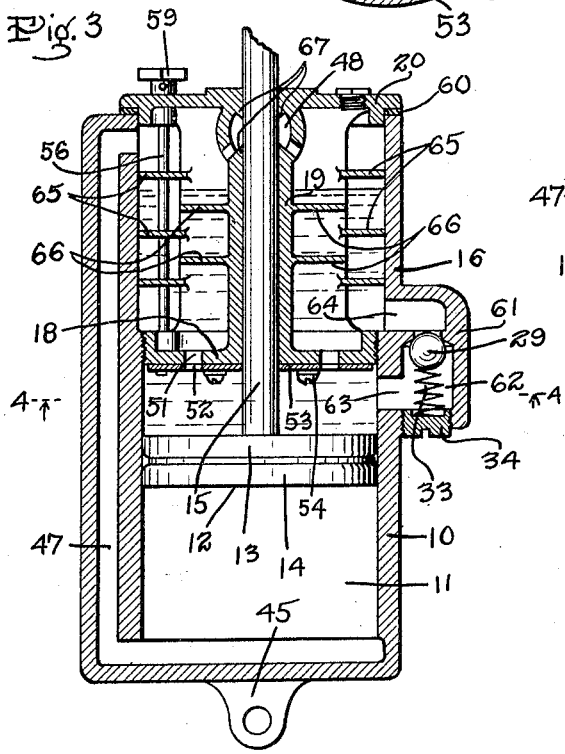
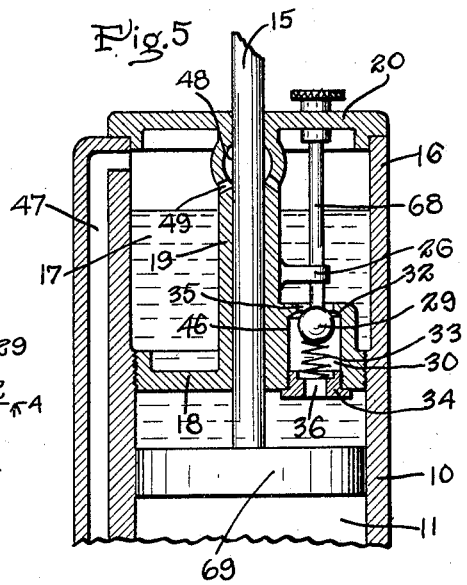
Inventor:
Franklin Wesley Springer

UNITED STATES PATENT OFFICE.

FRANKLIN WESLEY SPRINGER, OF MINNEAPOLIS, MINNESOTA.

SHOCK-ABSORBER FOR VEHICLES.

1,387,081.  Specification of Letters Patent.  Patented Aug. 9, 1921.

Application filed August 31, 1917. Serial No. 189,120.

*To all whom it may concern:*

Be it known that I, FRANKLIN WESLEY SPRINGER, a citizen of the United States, residing at Minneapolis, in the county of Hennepin and State of Minnesota, have invented a new and useful Improvement in Shock-Absorbers for Vehicles, of which the following is a specification.

My invention relates to shock absorbers for motor vehicles and has for its object to provide a liquid controlled piston device which may be applied to the two members of the vehicle connected by the body springs and which will permit the same to move together at a relatively rapid speed but which will retard the rapidity of motion when these members tend to separate. Another object is to provide an adjoining splash chamber in which the displaced liquid is discharged and in which any liquid leaking past the piston may be forced. A still further object is to provide in conjunction with the splash chamber a bearing for the piston having liquid scraping and draining means for preventing leakage of liquid out of the device. A still further object is to construct the device so that substantially the entire assemblage of operating parts may be removed in one operation without altering the adjustment of the parts.

The full objects and advantages will appear in connection with the detailed description of my invention and are particularly pointed out in the claims.

In the drawings illustrating my invention in more than one form;

Figure 1 is a side elevational view of a portion of a vehicle spring frame and axle with my invention applied thereto.

Fig. 2 is a longitudinal sectional view of the shock absorber showing the construction of the parts.

Fig. 3 is a view similar to Fig. 2 showing a slightly modified form of my invention.

Fig. 4 is a section on line 4—4 of Fig. 3.

Fig. 5 is a view similar to Fig. 2 of a still different form of the invention.

My invention as best shown in Fig. 2 comprises a casing 10, formed at its lower portion with a cylinder 11, in which is slidably mounted a piston 12. This piston is constructed with a pair of oppositely turned leather members 13 and 14 attached to a piston rod 15 and making preferably a tight joint with the cylinder in both directions of travel of the piston. Above cylinder 11, casing 10 is extended at 16 forming an upper chamber or compartment 17, which is separated from cylinder 11 by a partition 18. This partition snugly fits the top of cylinder 11 and is formed integral with a neck 19, through which the piston rod 15 extends and with a flanged portion 20, which is screwed into casing 10 at 21 and forms a closure member for the device. The flange 20 and partition 18 are stiffened by a number of longitudinal radial ribs 50 formed integral therewith.

Within the chamber 17 is poured a quantity of oil or other suitable liquid which is alternately drawn in to the cylinder 11 and discharged back again into said chamber to produce the results desired in the following manner. Partition 18 is provided with an opening 22 formed at its upper portion with a valve seat 23. Above the same is positioned a valve member 24 mounted on a spindle 25 screwed into a lug 26 protruding from neck 19, which spindle extends out beyond the casing through a boss 27 formed on the under side of member 20 and terminates in a thumb screw 28 by means of which the valve head 24 may be adjusted to give any size of opening through the passageway 22. On the other side of the partition 18 is constructed a check valve 46 which comprises a ball 29 confined within a valve chamber 30 formed in an enlargement 31 of the partition 18. This ball is held seated against a seat 32 in enlargement 31 by means of a coil spring 33 which is held in place by a hollow cap 34 screwable into the partition 18 at the opening of chamber 30 into the cylinder 11. When the pressure is reduced in cylinder 11 the ball 29 is unseated against the action of spring 33 and the liquid in chamber 17 rushes freely through a passageway 35 communicating with chamber 30 and through an opening 36 in the cap 34 into cylinder 11.

One method of attachment of the shock absorber to the vehicle is shown in Fig. 1. A frame member 38 has a spring 39 pivoted thereto, which spring is secured to an axle 40 by means of U bolts 41. Piston rod 15 is provided at its upper end with a head 37 by means of which the same is pivoted to frame member 38 through a bolt 42. A bracket 48' is secured to axle 40 by U bolts 43 and is provided with an arm 44 which is pivoted to a lug 45 formed on the under side of the casing 10. This bracket is so shaped that the casing 10 is brought away from the axle 40 and partly below it giving the device ample movement and clearance.

The operation of the shock absorber is evident. In the normal position piston 12 rests substantially as shown in Fig. 3. When the vehicle wheels strike a bump the axle 40 is quickly raised and casing 10 moves with it. This moves the piston 12 downward relative to cylinder 11 causing the liquid in chamber 17 to be freely drawn through the check valve 46, some of it passing through opening 22 into the cylinder 11. On the return stroke of the piston, valve 46 is closed and practically all of the liquid imprisoned in cylinder 11 slowly escapes through the opening 22 back again into chamber 17 which reduces the rapidity of the relative return movement of the vehicle axle and body in accordance with the adjustment of the spindle valve 24.

Since the portion of the system below piston 12 does not come into action to bring about the retardation of movement of the parts, a breather by-pass 47 is provided which brings the space in cylinder 11 below piston 12 into communication with the chamber 17 so that displacement of fluid in this space may be readily made. Any liquid that leaks past piston 12 is hence discharged through this passageway back into chamber 17 as soon as the device is brought into action. With this construction the pressure in chamber 17 is always atmospheric and no air is drawn into or forced out of the casing frame to the outside. The travel of liquid is hence along piston rod 15 and to prevent flow of the same out of the device an annular cavity 48 is formed in neck 19 about piston rod 15 which cavity communicates with chamber 17 through a number of apertures 49. Any liquid that passes by the piston rod hence collects in this cavity and drains back into chamber 17. The high liquid pressure around the piston rod below the cavity 48 is relieved on account of the liquid escaping into this cavity, and hence high liquid pressure around the piston rod where the latter passes to the exterior is avoided. In case the device is completely filled with oil, or if the piston is leaking, the lower portion of the cylinder will constantly contain oil, which, as the piston descends, will be forced up in the passageway 47, which is made sufficiently large and free for this purpose.

A modification of the invention is shown in Figs. 3 and 4. This form differs mainly in the valve construction. Here partition 18 is provided with a plurality of holes 51 adapted to register with a corresponding number of holes 52 in a plate 53 rotatably mounted on the partition 18. This plate is held in place upon the bottom of said partition by two screws 54 which pass through arcuate slots 55 in said plate. A spindle 56 passes through partition 18 and has an eccentric or cam shaped head 57, which operates in a slot 58 in plate 53 to oscillate the same to open or close the apertures 51 as said spindle is rotated. This spindle extends through flange member 20 and terminates in a thumb screw 59. In this form of the invention the partition 18 is shown as threaded into the cylinder 11, which necessitates the use of a gasket at 60. The check valve 62 in this case is formed in an enlargement 61 of the case 10 substantially at the partition 18 and is similar in construction to valve 46, but differing in the position of its outlet and inlet passages 63 and 64 which extend horizontally through the wall of casing 10. The enlargement 61 thus constitutes a by-pass pocket connecting the chamber on one side of the partition with the space in the casing on the other side of the pocket. To prevent splashing in chamber 17 a series of staggered annular partitions 65 and 66 may be employed which are formed integral with the webs 50 and are supported thereby. If desired the stem 19 at cavity 48 may be formed with angular annular projections 67 which scrape the oil from piston rod 15 and direct it into said cavity where the same may drain into the chamber 17.

If desired the leakage opening 22 may be dispensed with as shown in Fig. 5. Here a spindle 68 is employed similar to spindle 25 which simply screws down and unseats the ball valve 29 the liquid then passing freely through this valve in one direction, and slowly through it in the other direction. A solid piston 69 may be employed instead of the leather piston if desired.

The advantages of my invention are manifest. The device is extremely simple in operation and is cheap to construct. All of the parts may be quickly removed for inspection or replacement. Wear of any of the parts will not cause the liquid to leak out of the casing and leakage in the piston can be taken care of by properly regulating the adjusting screw.

I claim:

1. A shock absorber comprising a casing forming a cylinder and an adjoining chamber connected with the same having a liquid therein, a piston in the cylinder having a bearing in the casing, means for controlling the flow of liquid between the chamber and cylinder and means for conducting liquid driven through the piston bearing back into the adjoining chamber.

2. A shock absorber comprising a casing forming a cylinder, a piston therein, an adjoining chamber communicating with said cylinder on the effective shock absorbing side of said piston, means for retarding the flow of liquid from the cylinder to the chamber and for permitting the fluid to rapidly reënter the cylinder, and a relatively free liquid and air passage way connecting the cylinder at its outer end with the said chamber above the level of liquid therein.

3. A shock absorber comprising a cylindrical casing open at one end, and having a fluid therein, a member adapted to be secured to said casing having a closure head and a partition connected therewith, dividing the cylinder into two chambers and a piston in one of said chambers adapted to pump a liquid from one chamber to the other.

4. A shock absorber comprising a cylindrical casing open at one end, and having a fluid therein, a member adapted to be secured to said casing having a closure head and a partition connected therewith, dividing the cylinder into two chambers and a piston in one of said chambers adapted to pump a liquid from one chamber to the other, said piston having a piston rod extending through said member.

5. A shock absorber comprising a cylindrical casing having a liquid therein and open at one end, a head for closing said opening, a partition spaced from said head and snugly fitting in said casing, a neck integrally connecting said partition and head, and a piston in said casing adapted to pump liquid from and into the space between said head and partition members, said piston having a piston rod extending through said neck.

6. A shock absorber comprising a cylindrical casing having a liquid therein and open at one end, a head for closing said opening, a partition spaced from said head, a neck connecting said partition and head, and a piston in said casing adapted to pump liquid from and into the space between said head and partition members, said piston having a piston rod extending through said neck and the neck being constructed with an annular cavity and passageways leading therefrom for conducting the liquid pumped up through the neck, back again into said aforenamed liquid space.

7. A shock absorber comprising a casing forming a cylinder and an auxiliary chamber having a liquid therein a piston in the cylinder having a bearing, means for controlling the flow of liquid from and into the chamber, a passageway leading from said auxiliary chamber to the cylinder on the side of the piston opposite the flow controlling means, and means for conducting the liquid driven up through the piston bearing into the auxiliary chamber.

8. A shock absorber comprising a cylinder, a piston therein, an adjoining chamber communicating with said cylinder on the effective shock absorbing side of said piston, means for retarding the flow of liquid from the cylinder to the chamber and permitting a relatively free flow from the chamber to the cylinder, a piston rod passing through said chamber to the exterior combined with means for preventing the leakage of liquid to the exterior, and a relatively free liquid and air passageway connecting the cylinder at its outer end with the said chamber above the level of liquid therein.

9. A shock absorber comprising a casing forming a cylinder and an adjoining chamber connected with the same having a liquid therein, a piston in the cylinder, a piston rod connected with the piston and passing through a piston rod bearing in the said chamber, means for controlling the flow of liquid between the chamber and the cylinder and means for directing the liquid driven through the piston rod bearing into the said adjoining chamber.

10. A shock absorber comprising a cylinder, an adjoining chamber positioned above the cylinder, a piston in the cylinder, a piston rod extending upward through the chamber, means for controlling the flow of liquid between the chamber and the cylinder and means for avoiding high liquid pressure around the piston rod where the latter passes to the exterior, substantially as described.

FRANKLIN WESLEY SPRINGER.

Witnesses:
A. G. ANDERSON,
H. W. DIXON.